(12) United States Patent
Jiang et al.

(10) Patent No.: US 8,854,946 B2
(45) Date of Patent: Oct. 7, 2014

(54) METHOD AND APPARATUS FOR GENERATING STANDARD CANCELLATION SIGNALSTANDARD CANCELLATION SIGNAL

(71) Applicant: Huawei Technologies Co., Ltd., Shenzhen (CN)

(72) Inventors: Yong Jiang, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 13/652,845

(22) Filed: Oct. 16, 2012

(65) Prior Publication Data

US 2013/0040652 A1    Feb. 14, 2013

Related U.S. Application Data

(63) Continuation of application No. PCT/CN2011/071255, filed on Feb. 24, 2011.

(30) Foreign Application Priority Data

Apr. 16, 2010 (CN) .......................... 2010 1 0148463

(51) Int. Cl.
*H04J 11/00* (2006.01)
*H04L 27/26* (2006.01)

(52) U.S. Cl.
CPC ......... *H04J 11/0023* (2013.01); *H04L 27/2624* (2013.01)
USPC ........... 370/210; 370/203; 370/205; 370/465; 370/208; 370/320

(58) Field of Classification Search
USPC .................................. 370/207, 210, 208, 206
See application file for complete search history.

(56) References Cited

U.S. PATENT DOCUMENTS 6,175,551 B1   1/2001 Awater et al.
6,928,084 B2 * 8/2005 Cimini et al. ................. 370/430
(Continued)

FOREIGN PATENT DOCUMENTS

| CN | 1703037 | 11/2005 |
| CN | 101150357 | 3/2008 |
| CN | 101420404 | 4/2009 |
| CN | 1016458642 A | 2/2010 |

OTHER PUBLICATIONS

International Search Report of PCT/CN2011/071255 mailed Jun. 2, 2011.

(Continued)

*Primary Examiner* — Ricky Ngo
*Assistant Examiner* — DeWanda Samuel
(74) *Attorney, Agent, or Firm* — Huawei Technologies Co., Ltd.

(57) ABSTRACT

A method and an apparatus for generating a standard cancellation signal includes: setting weight values according to frequency points of a current cell and its neighboring cells; according to the frequency points of the current cell and neighboring cells and the weight values of the frequency points, performing Fourier transform to obtain a corresponding time-domain signal; and performing highest amplitude normalization on the time-domain signal and performing a cyclic shift to obtain a standard cancellation signal. The embodiments generate a standard cancellation signal according to frequency points of the current cell and its neighboring cells, so that the current cell and its neighboring cells share the peak clipping noise, and therefore helping improve the peak clipping performance of the current cell or reduce the EVM distortion.

9 Claims, 5 Drawing Sheets

(56) References Cited

U.S. PATENT DOCUMENTS

| | | | |
|---|---|---|---|
| 7,463,698 B2* | 12/2008 | Fujii et al. | 375/303 |
| 7,526,042 B2* | 4/2009 | Yoshida | 375/285 |
| 7,634,024 B2* | 12/2009 | Tan | 375/297 |
| 7,839,949 B2* | 11/2010 | Hamada et al. | 375/296 |
| 2002/0105947 A1* | 8/2002 | Kitagawa et al. | 370/366 |
| 2003/0022639 A1* | 1/2003 | Hongo et al. | 455/116 |
| 2004/0052314 A1 | 3/2004 | Copeland | |
| 2004/0097201 A1* | 5/2004 | Yoon | 455/103 |
| 2004/0233836 A1* | 11/2004 | Sumasu et al. | 370/206 |
| 2005/0265479 A1 | 12/2005 | Fujii et al. | |
| 2010/0020895 A1* | 1/2010 | Jiang et al. | 375/295 |

OTHER PUBLICATIONS

Chinese Search Report mailed Apr. 16, 2010, issued in corresponding Chinese Patent Application No. 2010101484634.

International Search Report, dated Jun. 2, 2011, in corresponding International Application No. PCT/CN2011/071255 (4 pp.).

Written Opinion of the International Searching Authority, dated Jun. 2, 2011, in corresponding International Application No. PCT/CN2011/071255 (4 pp.).

Extended European Search Report, dated Feb. 11, 2013, in corresponding European Application No. 11768380.5 (5 pp.).

* cited by examiner

| Frequency Group Number | A1 | B1 | C1 | D1 | A2 | B2 | C2 | D2 | A3 | B3 | C3 | D3 |
|---|---|---|---|---|---|---|---|---|---|---|---|---|
| Frequency Point Numbers of Each Frequency Group | 94 | 93 | 92 | 91 | 90 | 89 | 88 | 87 | 86 | 85 | 84 | 83 |
| | 78 | 77 | 76 | 75 | 74 | 73 | 72 | 71 | 70 | 69 | 68 | 67 |
| | 66 | 65 | 64 | 63 | 62 | 61 | 60 | 59 | 58 | 57 | 56 | 55 |
| | 54 | 53 | 52 | 51 | 50 | 49 | 48 | 47 | 46 | 45 | 44 | 43 |
| | 42 | 41 | 40 | 39 | 38 | 37 | 36 | 35 | 34 | 33 | 32 | 31 |
| | 30 | 29 | 28 | 27 | 26 | 25 | 24 | 23 | 22 | 21 | 20 | 19 |
| | 18 | 17 | 16 | 15 | 14 | 13 | 12 | 11 | 10 | 9 | 8 | 7 |
| | 6 | 5 | 4 | 3 | 2 | 1 | | | | | | |

METHOD AND APPARATUS FOR GENERATING STANDARD CANCELLATION SIGNALSTANDARD CANCELLATION SIGNAL

CROSS-REFERENCE TO RELATED APPLICATIONS

This application is a continuation of International Application No. PCT/CN2011/071255, filed on Feb. 24, 2011 which claims priority to Chinese Patent Application No. 201010148463.4, filed with the Chinese Patent Office on Apr. 16, 2010, both of which are hereby incorporated by reference in their entireties.

FIELD OF THE APPLICATION

The present application relates to a communications technology field, and in particular, to a method and an apparatus for generating a standard cancellation signal

BACKGROUND OF THE APPLICATION

At present, to reduce costs and energy, a base station often uses the multi-carrier structure, for example, multi-carrier WCDMA (Wideband Code Division Multiple Access, wideband code division multiple access), multi-carrier GERAN (GSM/EDGE Radio Access Network, GSM/EDGE radio access network), and Single RAN (single radio access network), where multiple carrier signals are amplified and sent through one channel of power amplifier and antenna. A drawback of this structure is that the PAPR (Peak to Average Power Ratio, peak to average power ratio) of a synthesized multi-carrier signal is high, which results in low efficiency of a power amplifier. Therefore, the PAPR needs to be suppressed in order to improve the efficiency of the power amplifier.

In the prior art, peak clipping is used to suppress the PAPR. That is, a standard cancellation signal is preset to detect the peak of the input signal, and adjust the peak according to information, such as the amplitude and phase of the peak value, and peak clipping threshold. The specific method can be as follows: adjusting the amplitude and phase of the standard cancellation signal so that the amplitude at the highest point of the standard cancellation signal is equal to the amplitude at the peak value of the input signal minus the peak clipping threshold but the phases are reverse. Then, the cancellation signal after adjustment is overlaid on the input signal to reduce the amplitude of the peak value to the peak clipping threshold, thereby reducing the PAPR.

When developing the present application, the inventor finds at least the following drawbacks of the prior art:

In existing systems such as GSM and GERAN, during frequency planning, the actual frequency reuse factor is often greater than 1, and neighboring cells use different carrier frequency points to avoid co-channel interference between neighboring cells. As shown in FIG. 1, the frequency point used by the cell in the middle of the figure is 0 (corresponding to the frequency group number A1 in FIG. 2). The first-layer neighboring cell frequency points of the cell are 4, 6, 7, 8, 9, and 10 (corresponding to frequency group numbers A2, C2, D2, A3, B3, and C3 in FIG. 2 respectively); the second-layer neighboring cell frequency points are 1, 2, 3, 5, and 11 (corresponding to frequency group numbers B1, C1, D1, B2, and D3 in FIG. 2 respectively). FIG. 2 is a 4×3 frequency reuse allocation table.

The existing peak clipping solution uses only the frequency in the current cell by default to bear peak clipping noises. Therefore, the entire performance of the system is not good enough.

SUMMARY OF THE APPLICATION

Embodiments of the present application provide a method for generating a standard cancellation signal and an apparatus to improve the overall performance of a system. The technical solution comprises:

An embodiment provides a method for generating a standard cancellation signal, including:

setting weight values according to frequency points of a current cell and its neighboring cells;

according to the frequency points of the current cell and neighboring cells and the weight values of the frequency points, performing Fourier transform to obtain a corresponding time-domain signal; and performing highest amplitude normalization on the time-domain signal and performing a cyclic shift to obtain a standard cancellation signal.

An embodiment provides an apparatus for generating a standard cancellation signal, including:

a weight value setting module, configured to set weight values according to the frequency points of the current cell and its neighboring cells;

a Fourier transforming module, configured to: according to the frequency points of the current cell and neighboring cells, perform Fourier transform by using weight values corresponding to the frequency points to obtain the corresponding time-domain signal; and a highest amplitude normalizing module, configured to perform highest amplitude normalization on the time-domain signal and perform a cyclic shift to obtain the standard cancellation signal.

An embodiment further provides a method for suppressing a peak average power ratio by using the preceding method and apparatus for generating the standard cancellation signal. The method includes:

obtaining the standard cancellation signal according to the method and apparatus for generating the standard cancellation signal;

detecting a peak value of an input signal, and calculating an adjustment coefficient of an amplitude and a phase of the standard cancellation signal, wherein the adjustment coefficient is required for peak clipping;

caching and delaying the standard cancellation signal; where, delay time is half of a length of the standard cancellation signal;

correcting the standard cancellation signal according to the adjustment coefficient to obtain a cancellation signal so that a waveform obtained by overlaying the standard cancellation signal and the input signal is not greater than a preset threshold; and performing peak clipping on the input signal according to the delayed cancellation signal.

An embodiment further provides an apparatus for suppressing the peak average power ratio by using the preceding method and apparatus for generating the standard cancellation signal. The method includes:

a standard cancellation signal generating module, configured to obtain a standard cancellation signal according to the method and apparatus for generating the standard cancellation signal;

a detecting module, configured to detect a peak value of an input signal, and calculate an adjustment coefficient of an amplitude and a phase of the standard cancellation signal, wherein the adjustment coefficient is required for peak clipping;

a delaying module, configured to cache and delay the standard cancellation signal; where, delay time is half of the length of the standard cancellation signal;

a cancellation signal module, configured to correct the standard cancellation signal according to the adjustment coefficient to obtain a cancellation signal so that a waveform obtained by overlaying the standard cancellation signal and the input signal is not greater than the preset threshold; and a peak clipping module, configured to perform peak clipping on the input signal according to the delayed cancellation signal.

Beneficial effects of the embodiments are as follows: In these embodiments, a standard cancellation signal is generated according to frequency points of the current cell and its neighboring cells, and the standard cancellation signal is used to suppress the peak average power ratio, so that the current cell and its neighboring cells the peak clipping noise, and therefore helping improve the peak clipping performance of the current cell or reduce the EVM (Error vector magnitude) distortion. In addition, due to the existence of large-scale fading, the actual interference of the peak clipping noise in the current cell on the neighboring cells is small. As a result, peak clipping noise optimization is performed by considering frequency planning, helping improve the performance of the entire system.

BRIEF DESCRIPTION OF THE DRAWINGS

To better illustrate the technical solution of the present application, the drawings used for describing the embodiments of the present application are introduced briefly. It is understandable that the drawings merely describe several embodiments of the present application. Those skilled in the art can obtain other drawings based on these drawings without innovative work.

DETAILED DESCRIPTION OF THE EMBODIMENTS

The technical solution under the present application is described below with reference to the accompanying drawings. Evidently, the embodiments described below are for the exemplary purpose only, without covering all embodiments of the present application. Those skilled in the art can derive other embodiments from the embodiments given herein without any creative effort, and all such embodiments are covered in the protection scope of the present application.

Embodiment 1

Figure 3:
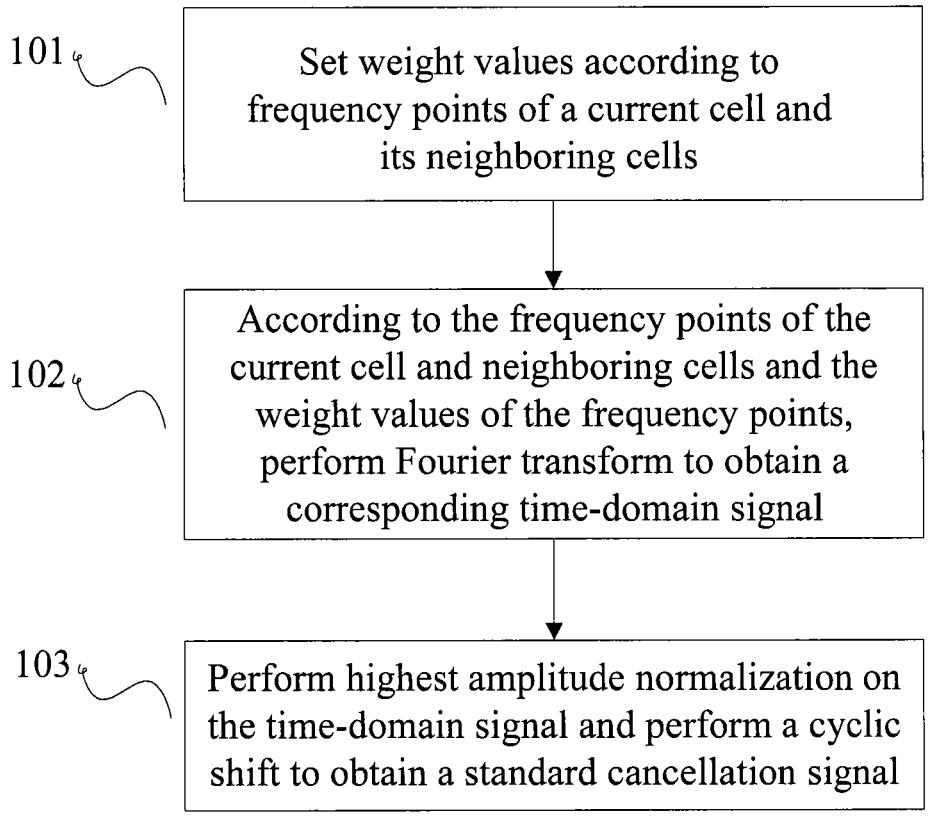
FIG. 3 is a flowchart of a first embodiment of the present application.

The embodiment provides a method for generating a standard cancellation signal. FIG. 3 shows the process, which includes the following steps:

Step 101: Set weight values according to frequency points of a current cell and its neighboring cells.

Step 102: According to the frequency points of the current cell and neighboring cells and the weight values of the frequency points, perform Fourier transform to obtain a corresponding time-domain signal.

Step 103: Perform highest amplitude normalization on the time-domain signal and perform a cyclic shift to obtain a standard cancellation signal.

In an embodiment, performing a cycle may be performing a ½ cyclic shift. The ½ cyclic shift means to exchange the positions of the first half sampling points of the signal that has undergone the highest amplitude normalization with the positions of the last half sampling points of the signal.

In this embodiment, a standard cancellation signal is generated according to frequency points of the current cell and its neighboring cells, and the standard cancellation signal is used to suppress the peak average power ratio, so that the current cell and its neighboring cells share the peak clipping noise, and therefore helping improve the peak clipping performance of the current cell or reduce the EVM distortion. In addition, due to the existence of large-scale fading, the actual interference of the peak clipping noise in the current cell on the neighboring cells is small. As a result, peak clipping noise optimization is performed by considering frequency planning, helping improve the entire system performance.

Embodiment 2

The embodiment provides a method for generating a standard cancellation signal, including the following steps:

Step 201: Set weight values according to frequency points of a current cell and its neighboring cells.

Figures 1, 2:
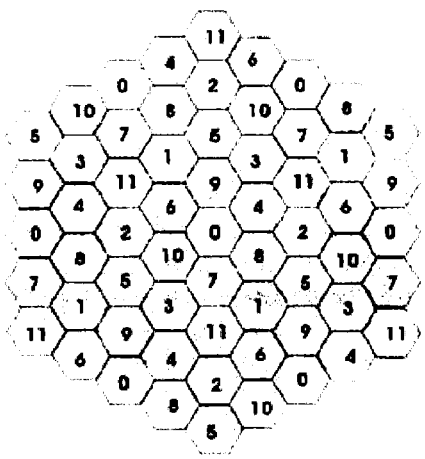
FIG. 1 is a structural schematic diagram of an existing mobile communication network.
FIG. 2 shows a frequency reuse allocation table corresponding to frequency points in FIG. 1.

The network architecture shown in FIG. 1 is taken as an example. This network architecture has 94 frequency points. The weight value of the current cell whose frequency point is 0 may be set to 1; the weight values of the surrounding cells of the current cell, that is, first-layer cells whose frequency points are 4, 6, 7, 8, 9, and 10, may be set to 2; the weight values of the peripheral cells of the current cell, that is, second-layer cells whose frequency points are 1, 2, 3, 5, and 11, may be set to 3. Therefore, a weight vector is generated: $\check{W}=[w_1 \ w_2 \ 6 \ w_{94}]$.

Step 202: According to the frequency points of the current cell and neighboring cells and the weight values of the frequency points, perform fast Fourier transform to obtain a corresponding time-domain signal.

The network architecture shown in FIG. 1 is taken as an example. This network architecture has 94 frequency points in total. The frequency difference between frequency points is 200 kHz. The point number for IFFT (inverse fast Fourier transform) may be set to $2^e$, where e is a positive integer and $2^e$ is greater than the minimum positive integer of the frequency point number. Taking 94 frequency points as an example, 128 points are required, that is, the value of e is 7. In an embodiment, over-sampling needs to be performed for the signal during peak clipping. Taking 4-times over-sampling as an example, 4×128=512 points are required to generate the standard cancellation signal.

The weight values are used to adjust the point number $2^e$, and the point number after adjustment is used as the input point number for fast Fourier transform to obtain the time-domain signal $\check{x}=[x_0 \ x_1 \ 6 \ x_{n-1}]$. The method is as follows:

Assuming that the input for IFFT is $\check{X}=[X_0 \ X_1 \ 6 \ X_{511}]$, and $\check{W}$ is initialized to 0. Then the last half (that is, the weight values of frequency points 48 to 94) of the weight vector $\check{W}=[w_1 \ w_2 \ 6 \ w_{94}]$ that is generated in step 201 is assigned to $X_0 X_1 6 X_{46}$; the first half (that is, the weight values of frequency points 1 to 47) of the weight vector $\vec{W}$ is assigned to $X_{465} X_{466} 6 X_{511}$. No values are assigned to $X_{47} X_{48} 6 X_{464}$, that is, they remain unchanged.

Then, IFFT is performed on $\check{X}$ to obtain the time-domain signal: $\check{x}=[x_0 x_1 6 x_{511}]$.

IFFT is an existing technology. The formula may be expressed as follows:

$$x_i = \sum_{k=0}^{n-1} X_k e^{j2\pi \frac{ik}{n}},$$

where i indicates an index of a time-domain signal sampling point, i=0, 1, ..., n−1; k indicates an index of a frequency-domain subcarrier, k=0, 1, ..., n−1; j=$\sqrt{-1}$.

Certainly, using IFFT in the preceding embodiment is merely an embodiment of the present application. Fourier transform may be used for the implementation. The embodiments of the present application do not confine the methods.

Step 203: Perform highest amplitude normalization on the time-domain signal to obtain a standard cancellation signal, that is:

Obtain the maximum value $x_{max}$ of the time-domain signal, where, the highest amplitude normalization means to divide each sampling point of the time-domain signal by the maximum value $x_{max}$, and a waveform is $\vec{x}'=[x'_0 x'_1 \ldots x'_{n-1}]=\vec{x}./x_{max}$. The expression "./" in the foregoing equation is known to those skilled in the art as a mathematical expression in Matlab that specifies that the subsequent division by $x_{max}$ is to be performed on each entry of the array x. The "period" that follows x indicates that the subsequent division is to be performed element-by-element, as opposed to being performed as a matrix operation. Those skilled in the art understand that the above equation, together with all equations in this Application, are meant to include and encompass equations that may appear or be expressed differently in different programming languages, but which accomplish the same mathematical operations defined by the Matlab expression of the equations in this Application.

Then perform a cyclic shift, that is, exchange the positions of the first half sampling points of the time-domain signal that has undergone the highest amplitude normalization with the positions of the last half sampling points of the signal, and use the waveform $\check{p}=[x'_{n/2} x'_{n/2+1} 6 x'_{n-1} x'_0 x'_1 6 x'_{n/2-1}]$ that has undergone the exchange as the standard cancellation signal.

A cyclic shift can be a ½ cyclic shift.

The highest amplitude normalization means to divide each sampling point of the time-domain signal by the maximum value $x^{max}$ in a sampling point of the time-domain signal.

The ½ cyclic shift means to exchange the positions of the first half sampling points of the time-domain signal with the positions of the last half sampling points, that is, exchange the position of each sampling point in the first half of the time-domain signal with the position of the corresponding sampling point in the last half; for example, exchange the position of the first sampling point in the first half of the time-domain signal with the position of the first sampling point in the last half; exchange the position of the second sampling point in the first half of the time-domain signal with the position of the second sampling point in the last half; ..., the rest can be deduced through analogy.

This embodiment provides a specific implementation solution for obtaining a standard cancellation signal through IFFT to quickly and efficiently perform peak clipping by using the current cell and its neighboring cells.

The following further describes this embodiment by taking the network architecture shown in FIG. 1 as an example. The principle of this embodiment is as follows: the standard cancellation signal is used to control the frequency-domain distribution of the peak clipping noise to distribute the peak clipping noise not only on the frequency point of the current cell but also on the frequency points of neighboring cells. This distribution can include two methods: for example, using the current cell to assume a smaller peak clipping noise and using neighboring cells to assume a larger peak clipping noise.

FIG. 2 shows a frequency reuse allocation table corresponding to the frequency points in FIG. 1. Each column in FIG. 2 is a frequency group number. Each row in the column lists the frequency point numbers corresponding to the frequency group number. For example, the frequency group number of the first column is A1, and the corresponding frequency point numbers are 6, 18, 30, 42, 54, 66, 78, and 94; the frequency group number of the first column is B1, and the corresponding frequency point numbers are 5, 17, 29, 41, 53, 65, 77, and 93.

As shown in FIG. 1, the frequency point used by the cell in the middle is 0 (corresponding to the A1 frequency group number in FIG. 2, and the corresponding frequency point numbers of the A1 frequency group number are 6, 18, 30, 42, 54, 66, 78, and 94 shown in FIG. 2), the frequency points of the first-layer neighboring cells of the cell are: 4, 6, 7, 8, 9, and 10 (corresponding to A2, C2, D2, A3, B3, and C3 frequency group numbers in FIG. 2 respectively, and the corresponding frequency point numbers of each frequency group number are shown in FIG. 2), and the frequency points of the second-layer neighboring cells are: 1, 2, 3, 5, and 11 (corresponding to frequency group numbers B1, C1, D1, B2, and D3 in FIG. 2 respectively, and the corresponding frequency point numbers of each frequency group number are shown in FIG. 2).

Specifically, a smaller peak clipping noise may be distributed on the frequency point of the current cell, a larger peak clipping noise may be distributed on the frequency points of the first-layer neighboring cells, and the largest peak clipping noise can be distributed on the frequency points of the second-layer neighboring cells. Specifically, the following is included:

The 4×3 frequency allocation shown in FIG. 1 and FIG. 2 is taken as an example. This network has 94 frequency points in total. As shown in FIG. 1, the frequency point used by the cell in the middle of the figure is 0 (corresponding to the frequency group number A1 in FIG. 2). The first-layer neighboring cell frequency points of the cell are 4, 6, 7, 8, 9, and 10 (corresponding to frequency group numbers A2, C2, D2, A3, B3, and C3 in FIG. 2 respectively); the second-layer neighboring cell frequency points are 1, 2, 3, 5, and 11 (corresponding to frequency group numbers B1, C1, D1, B2, and D3 in FIG. 2 respectively). FIG. 2 shows a 4×3 frequency reuse allocation table for the frequency points in FIG. 1. Therefore, these 94 frequency points may be identified as a weight vector whose length is 94: $\vec{W}=[w_1 w_2 6 w_{94}]$.

Step 1: Take the case that the cell whose frequency point is 0 is used as the current cell (corresponding to the frequency group number A1 in FIG. 2) in FIG. 1 as an example. Set a weigh value 1 to the frequency points corresponding to the frequency group number A1, that is, $w_k=1$, k=6, 18, 30, 42, 54, 66, 78, 94. k indicates each frequency point corresponding to the frequency group number A1 shown in FIG. 2; in FIG. 2, the frequency point numbers corresponding to the frequency group number A1 are 6, 18, 30, 42, 54, 66, 78, and 94; therefore, the value of k is: k=6, 18, 30, 42, 54, 66, 78, 94.

Then, set a weight value 2 to the frequency points in the first-layer neighboring cells.

$w_k$=2, k=2, 14, 26, 38, 50, 62, 74, 90; 12, 24, 36, 48, 60, 72, 88; 11, 23, 35, 47, 59, 71, 87; 10, 22, 34, 46, 58, 70, 86; 9, 21, 33, 45, 57, 69, 85; 8, 20, 32, 44, 56, 68, 84.

k indicates each frequency point corresponding to the frequency group numbers A2, C2, D2, A3, B3, and C3 corresponding to the first-layer neighboring cells shown in FIG. 2. The frequency points of the first-layer neighboring cells are 4, 6, 7, 8, 9, and 10, and correspond to the frequency group numbers A2, C2, D2, A3, B3, and C3 in FIG. 2 respectively. Each frequency group number corresponds to a plurality of frequency point numbers. Therefore, as stated earlier, the frequency points of the first-layer neighboring cells are 4, 6, 7, 8, 9, and 10; these cells correspond to the A2, C2, D2, A3, B3, and C3 frequency group numbers in FIG. 2 respectively. Therefore, k indicates a collection of frequency point numbers corresponding to each of the frequency group numbers A2, C2, D2, A3, B3, and C3. That is, the frequency point numbers corresponding to the frequency group number A2 are 2, 14, 26, 38, 50, 62, 74, and 90; the frequency point numbers corresponding to the frequency group number C2 are 12, 24, 36, 48, 60, 72, and 88 . . . . Therefore, the value of k is the collection of the frequency point numbers corresponding to each of the preceding six frequency group numbers.

A larger peak clipping weight value 2 is set because large-scale fading exists and neighboring cells are considered to assume a larger peak clipping noise.

Set a larger weight value 3 for the second-layer neighboring cells, that is:

$w_k$=3, k=5, 17, 29, 41, 53, 65, 77, 93; 4, 16, 28, 40, 52, 64, 76, 92; 3, 15, 27, 39, 51, 63, 75, 91; 1, 13, 25, 37, 49, 61, 73, 90; 7, 19, 31, 43, 55, 67, 83.

k indicates each frequency point corresponding to the frequency group numbers B1, C1, D1, B2, and D3 corresponding to the first-layer neighboring cells shown in FIG. 2.

Step 2: Perform IFFT on the set weight values to transform the values to a time domain.

Perform fast Fourier transform to generate a standard cancellation signal according to the weight values obtained in step 1 and the frequency points in each cell.

The point number of an IFFT module that is configured to perform fast Fourier transform may be designed to a form of a power of 2 which is equal to or greater than 94. Here, The 128-point IFFT may be used to generate the standard cancellation signal. In actual applications, a system needs to further perform 4-times over-sampling on the signal in peak value cancellation. In this case, 512-point (4×128) IFFT must be used to generate the standard cancellation signal.

For an IFFT module with 512 input points, assuming that the input for IFFT is $\check{X}=[X_0\ X_1\ 6\ X_{511}]$, and $\check{X}$ is initialized to 0.

Then the last half (that is, the weight values of frequency points 48 to 94) of the weight vector $\check{W}$ that is generated in step 1 is assigned to $X_0\ X_1\ 6\ X_{46}$; the first half (that is, the weight values of frequency points 1 to 47) of the weight vector $\check{W}$ is assigned to $X_{465}\ X_{466}\ 6\ X_{511}$. No values are assigned to $X_{47}\ X_{48}\ 6\ X_{464}$, that is, they remain unchanged.

Then, IFFT is performed on $\check{X}$ to obtain the time-domain signal: $\check{x}=[x_0\ x_1\ 6\ x_{511}]$.

IFFT is an existing technology. The formula may be expressed as follows:

$$x_i = \sum_{k=0}^{n-1} X_k e^{j2\pi\frac{ik}{n}},$$

where i indicates an index of a time-domain signal sampling point, i=0, 1, . . . , n−1; k indicates an index of a frequency-domain subcarrier, k=0, 1, . . . , n−1; j=$\sqrt{-1}$.

Step 3: Perform highest amplitude normalization on the time-domain signal obtained in step 2 to obtain the standard cancellation signal. That is:

Assuming $x_{max}=\max(x_k)$, k=0, 1, . . . , 511. The waveform after highest amplitude normalization is $\check{x}'=[x'_0\ x'_1\ 6\ x'_{n-1}]=\check{x}./x_{max}$. The waveform after the ½ cyclic shift is $\check{p}=[x'_{n/2}\ x'_{n/2+1}\ 6\ x'_{n-1}\ x'_0\ x'_1\ 6\ x'_{n/2-1}]$, which is used as the standard cancellation signal.

Embodiment 3

Figure 4:
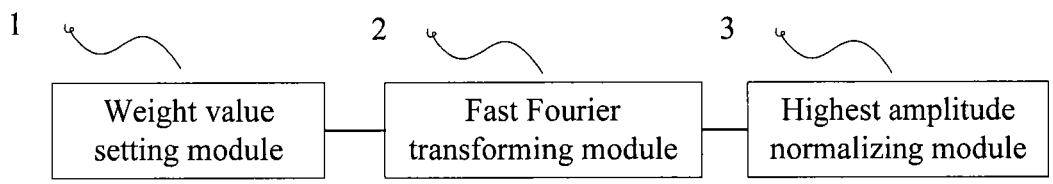
FIG. 4 is a structural schematic diagram of a third embodiment of the present application.

The embodiment provides an apparatus for generating a standard cancellation signal. FIG. 4 shows the structure of the apparatus, which includes:

a weight value setting module 1, configured to set weight values according to the frequency points of the current cell and its neighboring cells;

a Fourier transforming module 2, configured to: according to the frequency points of the current cell and neighboring cells, perform Fourier transform by using weight values corresponding to the frequency points to obtain a corresponding time-domain signal; and a highest amplitude normalizing module 3, configured to perform highest amplitude normalization on the time-domain signal and performing a cyclic shift to obtain the standard cancellation signal.

In this embodiment, a standard cancellation signal is generated according to frequency points of the current cell and its neighboring cells, and the standard cancellation signal is used to suppress the peak average power ratio, so that the current cell and its neighboring cells share the peak clipping noise, and therefore helping improve the peak clipping performance of the current cell or reduce the EVM distortion. In addition, due to the existence of large-scale fading, the actual interference of the peak clipping noise in the current cell on the neighboring cells is small. As a result, peak clipping noise optimization is performed by considering frequency planning, helping improve the performance of the entire system.

Embodiment 4

Figure 5:
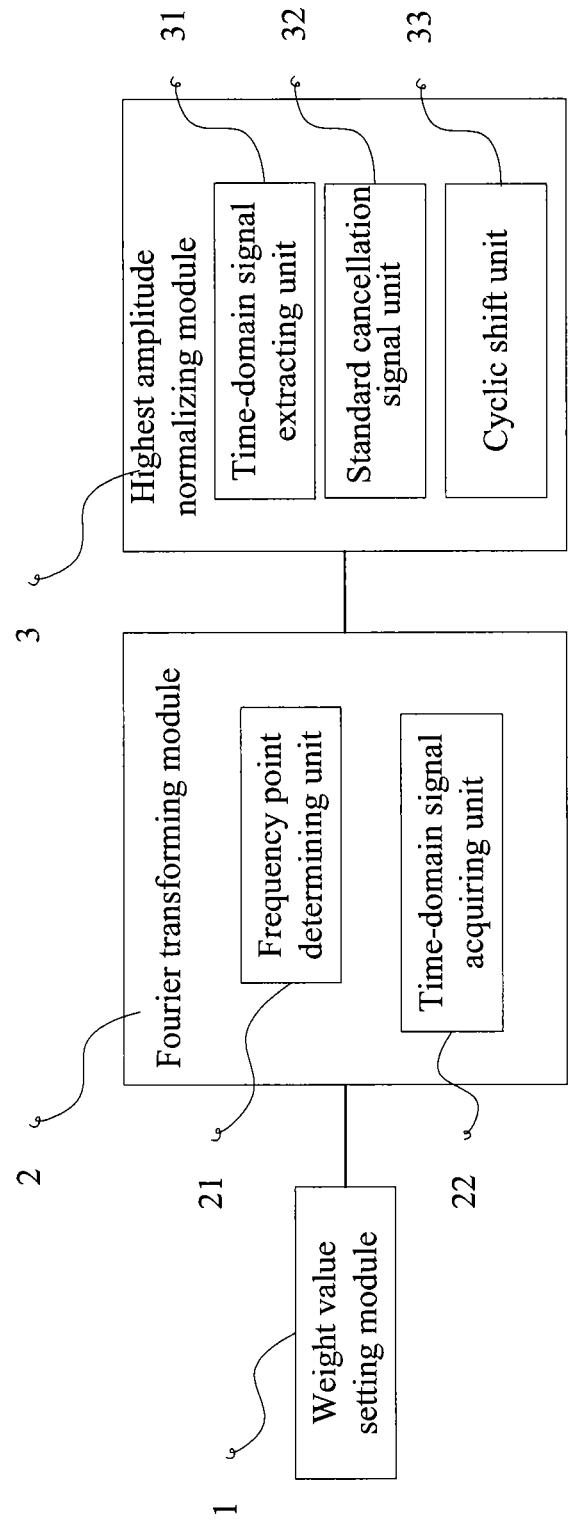
FIG. 5 is a structural schematic diagram of a fourth embodiment of the present application.

The embodiment provides an apparatus for generating a standard cancellation signal. FIG. 5 shows the structure of the apparatus, which includes:

a weight value setting module 1, configured to set weight values according to the frequency points of the current cell and its neighboring cells;

the following takes the network architecture shown in FIG. 1 as an example. The weight value of the current cell whose frequency point is 0 may be set to 1; the weight values of the surrounding cells of the current cell, that is, first-layer cells whose frequency points are 4, 6, 7, 8, 9, and 10, may be set to 2; the weight values of the peripheral cells of the current cell, that is, second-layer cells whose frequency points are 1, 2, 3, 5, and 11, may be set to 3; therefore, a weight vector is generated: $\check{W}=[w_1\ w_2\ 6\ w_{94}]$;

a Fourier transforming module 2, configured to: according to the frequency points of the current cell and neighboring cells, perform Fourier transform by using weight values corresponding to the frequency points to obtain a corresponding time-domain signal. The Fourier transforming module 2 may use fast Fourier transform;

where, the Fourier transforming module 2 includes:

a frequency point determining unit 21, configured to determine a point number of the fast Fourier transform according to frequency points that participate in suppression on a network; where the point number is $n=2^e \times T$, in which $2^e$ indicates the minimum positive integer that is greater than the frequency point number and e is a positive integer, and T is an over-sampling rate; and a time-domain signal acquiring unit 22, configured to adjust the point number through the weight values, and use the point number that has undergone the adjustment as an input point number to perform the fast Fourier transform to obtain the time-domain signal $\check{x}=[x_0\ x_1\ 6\ x_{n-1}]$; where, the formula for Fourier transform is as follows:

$$x_i = \sum_{k=0}^{n-1} X_k e^{j2\pi \frac{ik}{n}},$$

where i indicates the index of a time-domain signal sampling point, $i=0, 1, \ldots, n-1$; k indicates the index of a frequency-domain subcarrier, $k=0, 1, \ldots, n-1$; $j=\sqrt{-1}$;

The network architecture shown in FIG. 1 is taken as an example. The network architecture has 94 frequency points. The frequency difference between frequency points is 200 kHz. The point number of IFFT (inverse fast Fourier transform) may be set to $2^e$, where $2^e$>the frequency point number. Taking 94 frequency points as an example, 128 points are required. In an existing system, over-sampling needs to be performed on the signal during peak clipping. Taking 4-times over-sampling as an example, $4 \times 128 = 512$ points are required to generate the standard cancellation signal.

The weight values are used to adjust the point number $2^e$, and the point number after adjustment is used as the input point number to perform fast Fourier transform to obtain the time-domain signal $\check{x}=[x_0\ x_1\ 6\ x_{n-1}]$. The method is as follows:

assuming that the input for IFFT is $\check{X}=[X_0\ X_1\ 6\ X_{511}]$, and $\check{W}$ is initialized to 0. Then the last half (that is, the weight values of frequency points 48 to 94) of the weight vector $\check{W}=[w_1\ w_2\ 6\ w_{94}]$ that is generated by the weight value setting module 1 is assigned to $X_0\ X_1\ 6\ X_{46}$; the first half (that is, the weight values of frequency points 1 to 47) of the weight vector $\check{W}$ is assigned to $X_{465}\ X_{466}\ 6\ X_{511}$. Then, IFFT is performed on $\check{W}$ to obtain the time-domain signal: $\check{x}=[x_0\ x_1\ 6\ x_{511}]$. No values are assigned to $X_{47}\ X_{48}\ 6\ X_{464}$, that is, they remain unchanged;

where, IFFT is an existing technology. The formula can be expressed as follows:

$$x_i = \sum_{k=0}^{n-1} X_k e^{j2\pi \frac{ik}{n}},$$

where i indicates the index of the time-domain signal sampling point, $i=0, 1, \ldots, n-1$; k indicates the index of the frequency-domain subcarrier, $k=0, 1, \ldots, n-1$; $j=\sqrt{-1}$;

certainly, using IFFT in the preceding embodiment is merely an embodiment of the present application. Fourier transform may be used for the implementation. The embodiments of the present application do not confine the methods; and a highest amplitude normalizing module 3, configured to perform highest amplitude normalization on the time-domain signal obtained by the fast Fourier transforming module.

The highest amplitude normalizing module 3 includes:

a time-domain signal extracting module 31, configured to obtain the maximum value $x_{max}$ of the time-domain signal;

a standard cancellation signal unit 32, configured to divide each sampling point value on which the highest amplitude normalization is performed by the maximum value $x_{max}$; where, a waveform is $\check{x}'=[x'_0\ x'_1\ 6\ x'_{n-1}]=\check{x}./x_{max}$; and a cyclic shift unit 33, configured to perform a cyclic shift to exchange the positions of the first half sampling points of the time-domain signal that has undergone the highest amplitude normalization with the positions of the last half sampling points of the signal, and use a waveform $\check{p}=[x'_{n/2}\ x'_{n/2+1}\ 6\ x'_{n-1}\ x'_0\ x'_1\ 6\ x'_{n/2-1}]$ that has undergone the exchange as the standard cancellation signal.

A cyclic shift can be a ½ cyclic shift.

This embodiment provides a specific implementation solution for obtaining a standard cancellation signal through IFFT to quickly and efficiently perform peak clipping by using the current cell and its neighboring cells.

Embodiment 5

Figure 6:
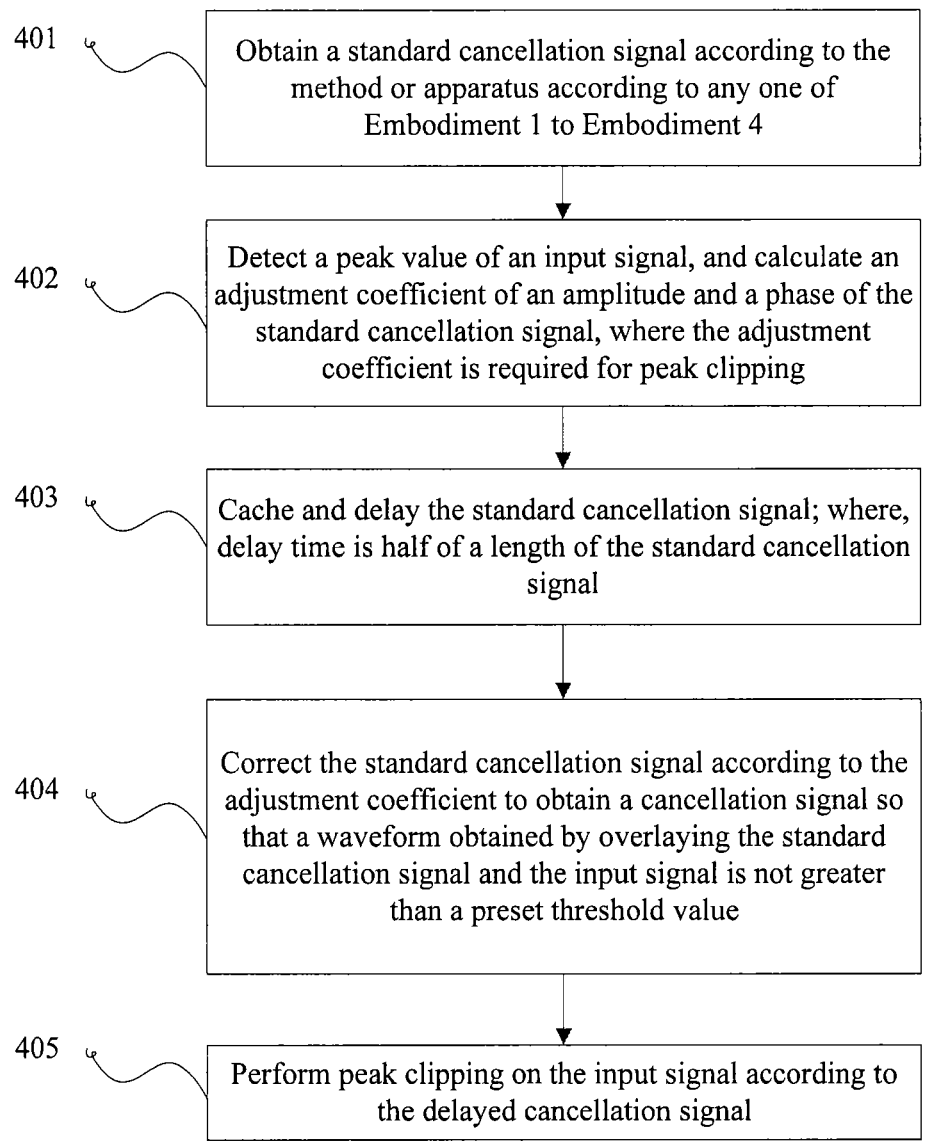
FIG. 6 is a flowchart of a fifth embodiment of the present application.

The embodiment provides a method for suppressing a peak average power ratio by using a standard cancellation signal provided in Embodiment 1 to Embodiment 4. FIG. 6 shows the flow of the method, including the following steps:

Step 401: Obtain a standard cancellation signal according to the method or apparatus provided in any one of the first to fourth embodiments.

Step 402: Detect a peak value of an input signal, and calculate an adjustment coefficient of an amplitude and a phase of the standard cancellation signal, where the adjustment coefficient is required for peak clipping.

Step 403: Cache and delay the standard cancellation signal; where, delay time is half of a length of the standard cancellation signal.

Step 404: Correct the standard cancellation signal according to the adjustment coefficient to obtain a cancellation signal so that a waveform obtained by overlaying the standard cancellation signal and the input signal is not greater than a preset threshold.

Step 405: Perform peak clipping on the input signal according to the delayed cancellation signal.

In the embodiment, a standard cancellation signal is generated according to frequency points of the current cell and its neighboring cells, and the standard cancellation signal is used to suppress the peak average power ratio, so that the current cell and its neighboring cells share the peak clipping noise, and therefore helping improve the peak clipping performance of the current cell or reduce the EVM distortion. In addition, due to the existence of large-scale fading, the actual interference of the peak clipping noise in the current cell on the neighboring cells is small. As a result, peak clipping noise optimization is performed by considering frequency planning, helping improve the performance of the entire system.

Embodiment 6

Figure 7:
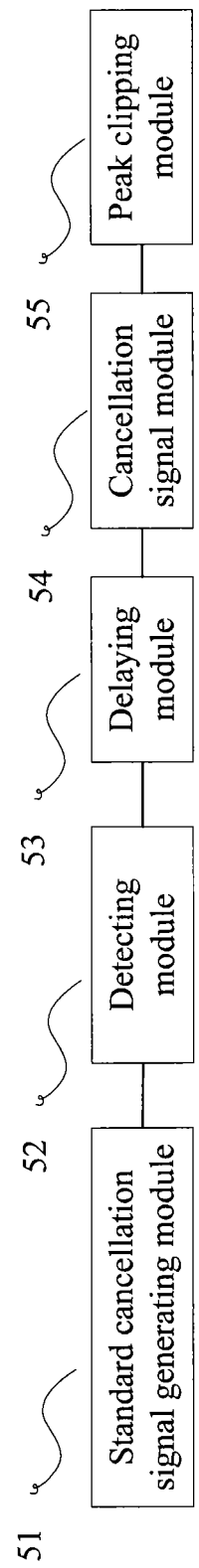
FIG. 7 is a structural schematic diagram of a sixth embodiment of the present application.

The embodiment provides an apparatus for suppressing a peak average power ratio by using a standard cancellation signal provided in any one of Embodiment 1 to Embodiment 4. FIG. 7 shows the structure of the apparatus, including:

a standard cancellation signal generating module 51, configured to obtain a standard cancellation signal according to the method or apparatus provided in any one of Embodiment 1 to Embodiment 4;

a detecting module 52, configured to detect a peak value of an input signal, and calculate an adjustment coefficient of an amplitude and a phase of the standard cancellation signal, wherein the adjustment coefficient is required for peak clipping;

a delaying module 53, configured to cache and delay the standard cancellation signal; where, delay time is half of the length of the standard cancellation signal;

a cancellation signal module 54, configured to correct the standard cancellation signal according to the adjustment coefficient to obtain the cancellation signal so that a waveform obtained by overlaying the standard cancellation signal and the input signal is not greater than a preset threshold; and a peak clipping module 55, configured to perform peak clipping on the input signal according to the delayed cancellation signal.

In this embodiment, a standard cancellation signal is generated according to frequency points of the current cell and its neighboring cells, and the standard cancellation signal is used to suppress the peak average power ratio, so that the current cell and its neighboring cells share the peak clipping noise, and therefore helping improve the peak clipping performance of the current cell or reduce the EVM distortion. In addition, due to the existence of large-scale fading, the actual interference of the peak clipping noise in the current cell on the neighboring cells is small. As a result, peak clipping noise optimization is performed by considering frequency planning, helping improve the performance of the entire system.

In Embodiment 1 to Embodiment 6, in the corresponding multi-carrier WCDMA signal, each carrier may correspond to a group of weights but not only one weight. This is because each cell is a neighboring cell of every other cell when each cell serves as the current cell.

If the integrated units are implemented through software function modules, and are sold or used as independent products, the integrated units can also be stored in a storage medium that is accessible to a computer. Based on such understanding, the technical solution in the present application can be essentially or the part that contributes to the prior art can be embodied in the form of a software product. This computer software product is stored in a storage medium, and includes several instructions that are configured for a computer device (which can be a personal computer, server, or network device) to execute all or certain steps of the method provided in each of the preceding embodiments of the present application. The preceding storage medium can be a medium that can store procedure codes. The medium can be read-only memory (ROM, Read-Only Memory), random access memory (RAM, Random Access Memory), magnetic disk, or compact disk.

The preceding embodiments are intended to illustrate but not to confine the present application. The application is intended to cover all the modifications, equivalent replacements, and improvements without departing from the principles of the application.

What is claimed is:

1. A method for generating a standard cancellation signal, comprising:

setting weight values according to frequency points of a current cell and its neighboring cells;

performing a fast Fourier transform to obtain a corresponding time-domain signal according to the frequency points of the current cell and neighboring cells and the weight values of the frequency points; and performing highest amplitude normalization on the time-domain signal and performing a cyclic shift to obtain a standard cancellation signal;

wherein the performing the fast Fourier transform comprises:

determining a point number of the fast Fourier transform according to frequency points that participate in suppression on a network, wherein the point number is $n=2^e \times T$, in which $2^e$ indicates a minimum positive integer that is greater than a frequency point number and e is a positive integer, and T is an over-sampling rate; and adjusting the point number according to the weight values, and using the point number that has undergone the adjustment to the fast Fourier transform to obtain a time-domain signal $\vec{x} = [x_0\ x_1\ \ldots\ x_{n-1}]$; wherein a formula for the fast Fourier transform is as follows:

$$x_i = \sum_{k=0}^{n-1} X_k e^{j2\pi \frac{ik}{n}},$$

where i indicates an index of a time-domain signal sampling point, $i=0, 1, \ldots, n-1$, k indicates an index of a frequency-domain subcarrier, $k=0, 1, \ldots, n-1$, and $j=\sqrt{-1}$.

2. The method for generating the standard cancellation signal according to claim 1, wherein the performing the highest amplitude normalization on the time-domain signal and the performing the cyclic shift to obtain the standard cancellation signal comprises:

obtaining a maximum value $x_{max}$ of the time-domain signal, wherein the highest amplitude normalization means to divide each sampling point of the time-domain signal by the maximum value $x_{max}$, and a waveform is $\vec{x}' = [x'_0\ x'_1\ \ldots\ x'_{n-1}] = \vec{x}./x_{max}$; and performing the cyclic shift by exchanging positions of first half sampling points of the time-domain signal that has undergone the highest amplitude normalization with positions of last half sampling points of the signal, and using a waveform $\vec{p} = [x'_{n/2}\ x'_{n/2+1}\ \ldots\ x'_{n-1}\ x'_0\ x'_1\ \ldots\ x'_{n/2-1}]$ that has undergone the exchange as the standard cancellation signal.

3. An apparatus for generating a standard cancellation signal, the apparatus comprising a non-transitory computer readable medium having stored thereon computer executable instructions for implementing a plurality of modules, the modules comprising:

a weight value setting module, configured to set weight values according to frequency points of the current cell and its neighboring cells;

a fast Fourier transforming module, configured to: according to the frequency points of the current cell and neighboring cells, perform a fast Fourier transform by using weight values corresponding to the frequency points to obtain a corresponding time-domain signal; and a highest amplitude normalizing module, configured to perform highest amplitude normalization on the time-domain signal and perform a cyclic shift to obtain the standard cancellation signal;

wherein the fast Fourier transforming module comprises:
a frequency point determining unit, configured to determine a point number of the fast Fourier transform according to frequency points that participate in suppression on a network,
  wherein the point number is $n=2^e \times T$, in which $2^e$ indicates a minimum positive integer that is greater than a frequency point number and e is a positive integer, and T is an over-sampling rate; and
a time-domain signal acquiring unit, configured to adjust the point number through the weight values, and use the point number that has undergone the adjustment as an input point number to perform the fast Fourier transform to obtain the time-domain signal $\vec{x}=[x_0\ x_1\ \ldots\ x_{n-1}]$, wherein the formula for the fast Fourier transform is as follows:

$$x_i = \sum_{k=0}^{n-1} X_k e^{j2\pi \frac{ik}{n}},$$

where
  i indicates an index of a time-domain signal sampling point, $i=0, 1, \ldots, n-1$,
  k indicates an index of a frequency-domain subcarrier, $k=0, 1, \ldots, n-1$, and $j=\sqrt{-1}$.

4. The apparatus for generating the standard cancellation signal according to claim 3, wherein the highest amplitude normalizing module comprises:
  a time-domain signal extracting module, configured to obtain a maximum value $x_{max}$ of the time-domain signal;
  a standard cancellation signal unit, configured to divide each sampling point value of the time-domain signal by the maximum value $x_{max}$ during the highest amplitude normalization; wherein the waveform is $\vec{x}'=[x'_0\ x'_1\ \ldots\ x'_{n-1}]=\vec{x}./x_{max}$; and
  a cyclic shift unit, configured to perform a cyclic shift to exchange the positions of first half sampling points of the time-domain signal that has undergone the highest amplitude normalization with the positions of last half sampling points of the signal, and use a waveform $\vec{p}=[x'_{n/2}\ x'_{n/2+1}\ \ldots\ x'_{n-1}\ x'_0\ x'_1\ \ldots\ x'_{n/2-1}]$ that has undergone the exchange as the standard cancellation signal.

5. A method for suppressing a peak average power ratio, comprising:
  obtaining a standard cancellation signal;
  detecting a peak value of an input signal, and calculating an adjustment coefficient of an amplitude and a phase of the standard cancellation signal, wherein the adjustment coefficient is required for peak clipping;
  caching and delaying the standard cancellation signal, wherein delay time is half of a length of the standard cancellation signal;
  correcting the standard cancellation signal according to the adjustment coefficient to obtain a cancellation signal so that a waveform obtained by overlaying the standard cancellation signal and the input signal is not greater than a preset threshold; and
  performing peak clipping on the input signal according to the delayed cancellation signal, wherein the obtaining the standard cancellation signal comprises:
  setting weight values according to frequency points of a current cell and its neighboring cells;
  performing Fourier transform to obtain a corresponding time-domain signal according to the frequency points of the current cell and neighboring cells and the weight values of the frequency points; and
  performing highest amplitude normalization on the time-domain signal and performing a cyclic shift.

6. An apparatus for suppressing a peak average power ratio, comprising a non-transitory computer readable medium having stored thereon computer executable instructions for implementing a plurality of modules, the modules comprising:
  a standard cancellation signal generating module, configured to obtain a standard cancellation signal;
  a detecting module, configured to detect a peak value of an input signal, and calculate an adjustment coefficient of an amplitude and a phase of the standard cancellation signal, wherein the adjustment coefficient is required for peak clipping;
  a delaying module, configured to cache and delay the standard cancellation signal, wherein delay time is half of the length of the standard cancellation signal;
  a cancellation signal module, configured to correct the standard cancellation signal according to the adjustment coefficient to obtain a cancellation signal so that a waveform obtained by overlaying the standard cancellation signal and the input signal is not greater than a preset threshold; and
  a peak clipping module, configured to perform peak clipping on the input signal according to the delayed cancellation signal,
  wherein the standard cancellation signal generating module is configured to obtain a standard cancellation signal with:
    setting weight values according to frequency points of a current cell and its neighboring cells;
    performing Fourier transform to obtain a corresponding time-domain signal according to the frequency points of the current cell and neighboring cells and the weight values of the frequency points; and
    performing highest amplitude normalization on the time-domain signal and performing a cyclic shift.

7. The apparatus for suppressing a peak average power ratio according to claim 6, wherein the Fourier transform is fast Fourier transform.

8. The apparatus for suppressing a peak average power ratio according to claim 7, wherein the performing the Fourier transform to obtain the corresponding time-domain signal according to the frequency points of the current cell and the neighboring cells and the weight values of the frequency points comprises:
  determining a point number of the fast Fourier transform according to frequency points that participate in suppression on a network, wherein the point number is $n=2^e \times T$, in which $2^e$ indicates a minimum positive integer that is greater than a frequency point number and e is a positive integer, and T is an over-sampling rate; and
  adjusting the point number according to the weight values, and using the point number that has undergone the adjustment to the fast Fourier transform to obtain a time-domain signal $\vec{x}=[x_0\ x_1\ \ldots\ x_{n-1}]$, wherein a formula for the fast Fourier transform is as follows:

$$x_i = \sum_{k=0}^{n-1} X_k e^{j2\pi \frac{ik}{n}},$$

where
- i indicates an index of a time-domain signal sampling point, i=0, 1, . . . , n−1,
- k indicates an index of a frequency-domain subcarrier, k=0, 1, . . . , n−1, and $j=\sqrt{-1}$.

9. The apparatus for suppressing a peak average power ratio according to claim 8, wherein the performing highest amplitude normalization on the time-domain signal and the performing the cyclic shift comprises:
- obtaining a maximum value $x_{max}$ of the time-domain signal, wherein the highest amplitude normalization means to divide each sampling point of the time-domain signal by the maximum value $x_{max}$; and a waveform is $\vec{x}'=[x'_0\ x'_1\ \ldots\ x'_{n-1}]=\vec{x}./x_{max}$; and
- performing the cyclic shift by exchanging positions of first half sampling points of the time-domain signal that has undergone the highest amplitude normalization with positions of last half sampling points of the signal, and using a waveform $\vec{p}=[x'_{n/2}\ x'_{n/2+1}\ \ldots\ x'_{n-1}\ x'_0\ x'_1\ \ldots\ x'_{n/2-1}]$ that has undergone the exchange as the standard cancellation signal.

* * * * *